Feb. 6, 1968   W. A. EISELE   3,368,031
SUBSCRIPTION TELEVISION SYSTEM HAVING
PROGRAM USE RECORDING
Filed July 6, 1964   2 Sheets-Sheet 1

INVENTOR.
WILLIAM A. EISELE
BY
Ervin B. Steinberg

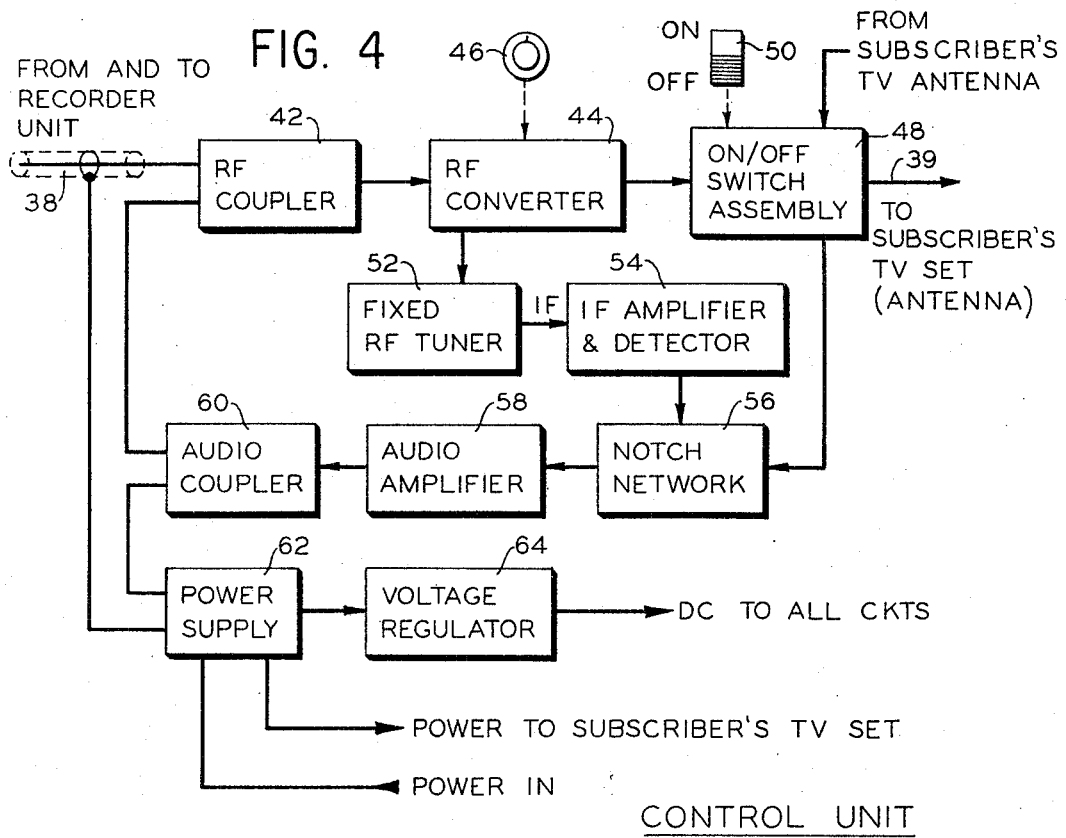
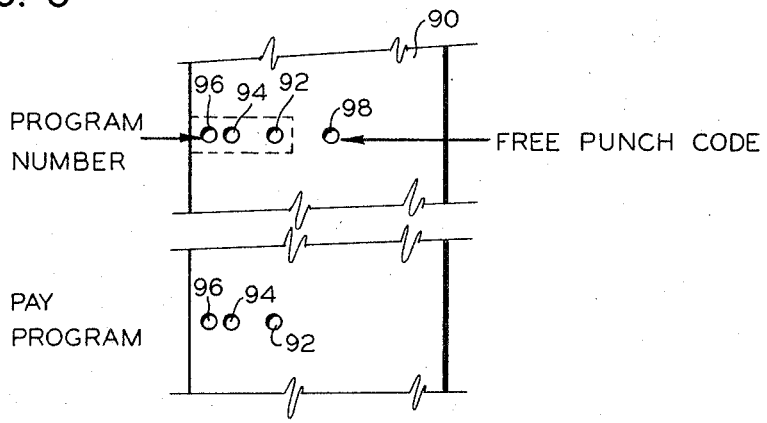

United States Patent Office 3,368,031
Patented Feb. 6, 1968

3,368,031
SUBSCRIPTION TELEVISION SYSTEM HAVING PROGRAM USE RECORDING
William A. Eisele, Pleasantville, N.Y., assignor to Universal Match Corporation, St. Louis, Mo., a corporation of Delaware
Filed July 6, 1964, Ser. No. 380,552
10 Claims. (Cl. 178—6)

ABSTRACT OF THE DISCLOSURE

In a television system wherein free and subscription programs are transmitted simultaneously, a recorder is provided at the receiver station for recording the condition whether a free or a subscription program is being received. The subscription program is provided with an inaudible code signal which is recorded by the recorder. The recording medium may be analyzed to determine whether a free or a subscription program was received, which of a plurality of subscription programs, and, if desired, the charge rate for the subscription program may be indicated also and used for billing purposes.

---

This invention has reference to a subscription television system and, more particularly, has reference to a subscription television system which includes means for accurately identifying and metering the usage of a program by a subscriber.

Various subscription television systems are known which transmit a television program by means of a cable connection to a subscriber station. Generally, billing for this service is accomplished on a time duration basis, wherein the subscriber is billed periodically for the total time during which his set was connected to the subscription television program. Other subscription schemes use a coded program on a broadcast channel and provide for the purchase by the subscriber of a coded card or disk which is inserted into a special conversion unit attached to the television set to decode the scrambled program.

The present invention discloses means for accurately ascertaining not only the time or duration when the television set is connected to a subscription program, but also to clearly indicate which subscription program is viewed or whether a free program is viewed during the period that a subscription program is transmitted. The instant arrangement permits furthermore, the transmission of programs having different charge rates. This latter feature is of particular importance when several programs are transmitted simultaneously, each having its own particular charge rate.

One of the principal objects of this invention, therefore, is the provision of a new and improved subscription television system.

Another object of this invention is the provision of a subscription television system which includes means for clearly identifying the programs and means for recording which of a plurality of programs is being viewed by the subscriber.

Another object of this invention is the provision of a subscription television system which includes means to clearly ascertain and record whether the subscriber's television set is connected to a subscription program or to a free, or non-subscription program, and the specific program period during which the subscriber's set is actuated.

A further object of this invention is the provision of a subscription television system in which each program has a superimposed thereupon an identifying code which is transmitted to the subscriber.

A still further object of this invention is the provision of a subscription television system which includes recording means actuated by code signals which are superimposed on the television program.

Another and still further object of this invention is to provide a subscription television system which includes a new and improved recording system and electronic circuits to more accurately ascertain the viewer's program choice.

Still further and other objects of this invention will be more clearly apparent by reference to the following description when taken in conjunction with the accompanying drawings, in which:

FIGURE 4 is a schematic block diagram of the major components in the control unit, and FIGURE 5 is a schematic view of a typical recording medium which records the condition of the subscriber's television set.

Figure 1:
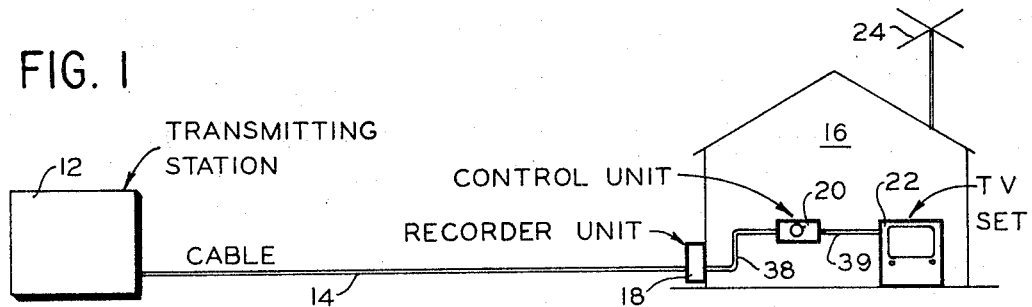
FIGURE 1 is a schematic diagram of the subscription television arrangement.

Referring now to the figures and FIGURE 1 in particular, there is indicated a transmitting station 12 which transmits via a coaxial cable 14 one or more television programs to a subscriber dwelling 16. The cable 14 is coupled first to a recorder unit 18 which, in a preferred manner, is mounted at the outside of the dwelling, similar to a conventional power meter box. From there, the program is transmitted by a cable 38 and reaches a control unit 20 and a conventional television set 22. As this control unit is used to control the connection of the television set to the subscription system or to a conventional program received via a conventional indoor or outdoor antenna 24, the unit is preferably disposed in close proximity to the television set. Having now described the general arrangement, the following description refers to those features which are new and peculiar to the present subscription system.

Figure 2:
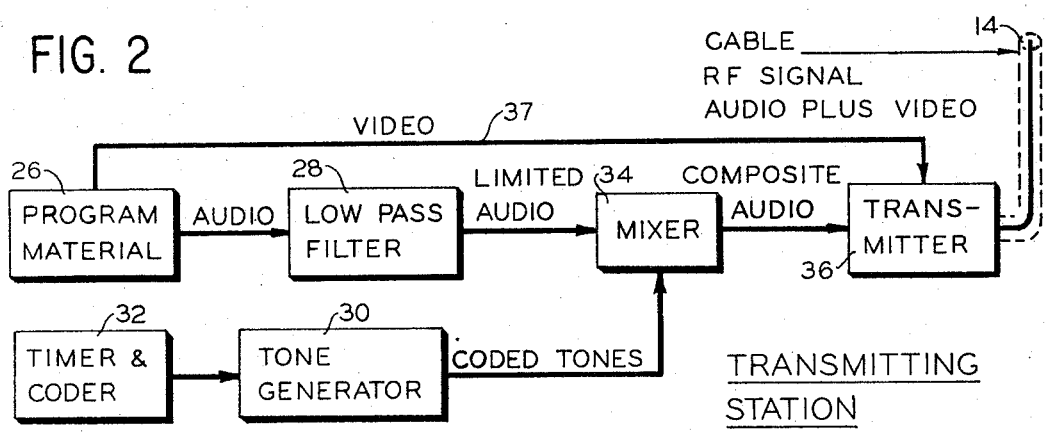
FIGURE 2 is a schematic electrical block diagram of the pertinent elements in the transmitting station.

A television program, which may be either a live studio show or a video tape program, is generated in the conventional manner and is assumed to be available as represented by block 26, FIGURE 2. The audio signal associated with this program is passed first through a filter 28 in order to limit the audio spectrum of the program to frequencies of less than 15,000 cycles per second. A tone generator 30 which can produce simultaneously multiple ultrasonic audio tones, is controlled by a timer and coder unit 32 in order to periodically generate a burst of ultrasonic tones. These coded tones are superimposed on the audio portion of the television program in a mixer circuit 34 and the composite audio signal of standard audio and periodically superimposed coded tone signal is passed on to the transmitter 36. The video portion of the program material reaches the transmitter 36 without alteration via coupling line 37. The video program with audio signal and the periodically superimposed code signal is then transmitted to various subscriber stations via coaxial cable 14.

Hence, the subscription television program transmitted is coded with a special identifying signal generated by the combination of a tone generator 30 and a timer and coder unit 32. If, for example, four different television programs are transmitted simultaneously, four sets of tone generators would be required in order to superimpose on each of the programs an identifying code. Alternatively, however, by appropriate switching, it is possible to utilize the same tone generator, using appropriate switching means within the tone generator.

In the preferred embodiment of this invention, the coded tones, which are added to the program audio material, represent a binary notation of the actual program number. Thus, if the program were number 13, three different ultrasonic signals are generated by suitable oscillators which are time controlled by timer and coder unit 32, and this signal, comprising three different tones, is transmitted for representing the decimal numbers of 8, 4, and 1. By extending the maximum number of simultaneous tones, or by sending within a short period of time two successive tone groups, it will be possible to assign numbers to a very large number of programs. For example, if two successive four tone code groups are transmitted, 255 different programs can be identified.

A further or second tone signal, in addition to the tone or group of tones which is utilized for identifying the program numbers, is transmitted with each program identifying signal. This additional tone is utilized by the subscriber's equipment for recording the condition of the subscriber's television set, particularly to record whether or not the subscription television feature is used during the time of transmitting a subscription type program.

The timer and coder 32 in conjunction with the tone generator 30 produces still another, or third, code signal which is mixed with the previously described audio signals. This third signal is not initiated at the same time as the program number code but lags. It is transmitted briefly after the program number identifying code has been generated for a short period of time, and overlaps in time the transmission of the program number code. This third signal is used to periodically initiate the program recording cycle at the subscriber's station.

The distribution system, particularly the coaxial cable 14, is standard equipment, having been developed previously in connection with other television signal transmission systems. The cable can be rented from the utilities companies on a service charge basis. No special features are required in the distribution cable for operating the instant subscription system.

The radio frequency signal with its composite audio and video signals is fed via cable 14 to the subscriber equipment. The signal reaches first a coupler 40, FIGURE 3, which is a part of the recorder unit 18. This recorder unit, preferably accessible from the outside of the subscriber's dwelling and to be described later, is connected by an inter-unit cable 38 to the control unit 20, disposed adjacent to the subscriber's television set 22. Within the control unit, a coupler 42, FIGURE 4, feeds the transmitted television signal to an R-F converter 44. This radio frequency converter permits the subscriber, by means of a selector knob 46, to select the desired subscription television channel, assuming that concurrently several programs are available via cable 14, and to convert, furthermore, the subscription R-F signal to a standard non-occupied television frequency, such as channel 6. This converted signal is, in turn, switched through the ON-OFF switch assembly 48 to the subscriber's television set 22. In the event that the subscriber does not wish to view the subscription program, the same switch assembly connects the subscriber's regular television antenna directly to the television set. When the switch assembly is in the OFF position, using switch knob 50, the subscription circuit is disconnected and the subscriber sees only non-subscription or free commercial television programs.

A second output from the radio frequency converter 44 is mixed with an oscillator signal in the fixed radio frequency tuner 52 and the resultant intermediate frequency signal is coupled to the amplifier and detector circuit 54. The output from this detector circuit comprises the composite audio signal which was used to modulate the transmitter 36 at the transmitting station. This composite audio signal is fed through a notch network 56 to an audio amplifier 58 and then to an audio coupler 60. The notch network 56 is activated only when the switch 50 of the switch assembly 48 is in the ON position, that is, the subscription television is connected to the subscriber's television set. The notch network is designed so that its frequency matches the additional, or second, tone signal which, preferably, is generated at the central programming equipment. Thus, the audio tones which are fed through the audio coupler 60 represent the program identifying code number plus the program audio when the switch assembly is in the ON position, and the program number, the additional code signal and the program audio when the switch assembly 48 is in the OFF position. Therefore, the audio tone group emerging from audio coupler 60 establishes not only the condition whether the subscriber is connected to the subscription television program or to the "free" program, but also information regarding the specific subscription television program which was passed up in favor of free commercial television. The control unit 20 is powered from the subscriber's wall receptable and the power supply 62 is designed so that the subscriber's television set is connected to the control unit. In this manner, it is determined by the electrical current drawn whether the subscriber's television set is on or off. The design of the power supply is such that the necessary voltages emerging from the voltage regulator 64 are generated only when the television set is activated. Additionally, the output of the power supply 62, the output of the audio coupler 60, and the input to the R-F coupler 42 are connected in series in such a manner that the inter-unit cabling 38 carries direct current and audio from the control unit to the recorder unit and radio frequency from the recorder unit to the control unit.

Figure 3:
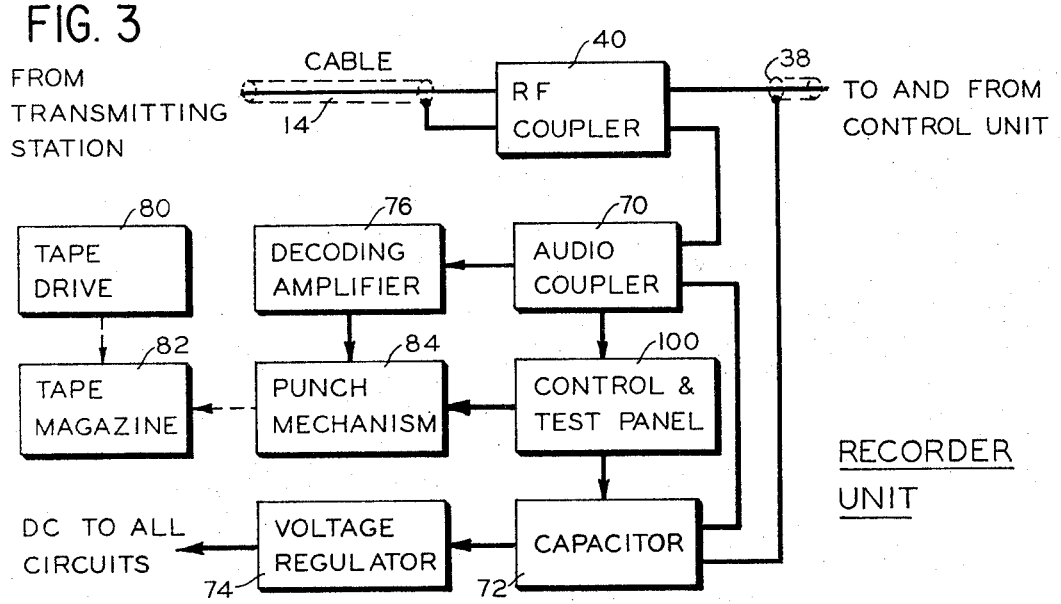
FIGURE 3 is a schematic block diagram of the components of the recorder unit.

At the recorder unit, FIGURE 3, the secondary winding of the radio frequency coupler 40, the primary winding of the audio coupler 70, and the power supply capacitor 72 are also connected in series. In this manner, the radio frequency signal is isolated from the audio signal, the audio signal from the direct current, and the capacitor is charged to the power supply voltage. The voltage across the capacitor circuit 72 is fed to a voltage regulator 74 to provide direct current to all of the active circuits. The output of the audio coupler 70 is fed to a frequency selective decoding amplifier 76 in order to decode the audio tone code signals. This amplifier has as many separate channels as there are possible tone code signals which are transmitted. Block 80 identifies a tape drive, either an electrically actuated or spring wound unit which provides driving power to a recording medium advanced from magazine 82. In a typical example, the medium comprises a paper tape or a disk. The tape is designed to be engaged by selectively operable punches which form a part of a punch mechanism 84. The punches are conditioned periodically by the decoding amplifier 76 upon the receipt of the program identifying code. When the third tone signal is transmitted, the punches are released to cause the punching of the tape. Subsequently, the tape drive mechanism advances the tape while the punches normalize themselves. This operation is repeated for each program code transmission, and in a typical example, the program code may be transmitted every six minutes.

In this manner, a line code recording is made for each tone code group which is transmitted with the subscription program. When the subscriber's television set is in the OFF position, no recording is made.

FIGURE 5 illustrates a typical recording. Paper tape 90 is provided in its upper portion with a punched program number code, numerals 92, 94, and 96, denoting respectively the digital code of 1, 4, and 8, or program code 13. Perforation 98 indicates that the subscriber's television set was connected to the standard television antenna and actuated, and thereby indicating that the subscriber was viewing a commercial free program while subscription program 13 was transmitted. The switch knob 50 was in the OFF position. In the lower portion of FIGURE 5, punches 92, 94, and 96 are seen, identifying program 13, but the free punch code 98 is omitted, thus, denoting that the subscriber viewed the subscription program identifed as number 13.

An agent of the subscription television system periodically, for instance, once a week or once a month, collects the various tapes from the different subscribers, the tapes are processed at a central processing station by computers or other automatic machinery, and billing is forwarded to the subscriber in the usual manner. In order that the agent of the subscription television system can ascertain that the subscriber's equipment is in order and operates properly, there is provided a control and test panel 100, FIGURE 3. This panel is used for monitoring the audio signal received at the subscriber station and flowing through the control unit 20 and, additionally, is used to insert the subscriber's billing number on the recording medium. Subscription service personnel, therefore, do not need to enter the dwelling in order to ascertain that the subscriber station is in good working order.

By the unique method of combining all signals on the one interunit cable 38, tamper-proof operation is assured. If the single conductor or its shielded wrapper is cut or broken, not only will a recording not be made, but the subscription television program itself will not be available to the subscriber. The control unit power supply 62 provides the power for its own circuits as well as that required by the recorder unit, the power being coupled by the cable portion 38.

When different programs are to be observed simultaneously within the same dwelling, it is readily possible to simply add additional control units. When such additional control units are added, separate inter-unit cables from the recorder unit to each of the control units are necessary. This addition, however, does not require any change in the recorder unit or in either of the control units since the program number coding, which is generated at the transmitting station, is merely superimposed on each of the programs in time spaced relation. Thus, if in a subscriber's dwelling two control units are being used to permit concurrently the observation of two different programs, the respective tone codes are transmitted and detected, and recording thereof will occur sequentially instead of simultaneously. The recording will depict then the total usage of all programs without the use of any supplementary equipment either for coding or decoding.

The foregoing arrangement permits, furthermore, different programs to be billed at different rates since each program can be identified separately by a code which not only signifies the particular program but also, if desired, the identifying rate. Alternatively, the frequency of code transmission and recording may be used to denote the rate at which a particular program is charged.

Although the example described heretofore illustrates a punched tape for the recording medium, it will be apparent to those skilled in the art that a magnetic recording tape or disk or any other of the well known recording techniques may be used.

A further alternative embodiment comprises the periodic recording and storage of the program code and of other identifying codes as may be desired. Subsequently, by means of an interrogation code and a readout circuit, such stored information is transmitted to a central station. For instance, the information pertaining to the subscriber's television viewing habits may be stored during the day and during the evening until past mid-night and then, in the early morning hours, an interrogation circuit triggers the recording unit to provide a readout and feedback transmission over the connecting line to the central station. This arrangement is particularly suited for magnetic storage means since this recording medium is readily erased after readout and reusable for further recording.

While there has been described and illustrated a certain preferred embodiment of my invention and several variations thereof, it will be apparent to those skilled in the art that various other and further modifications and changes may be made therein without deviating from the basic principles and intent of this invention, which shall be limited only by the scope of the appended claims.

What is claimed is:

1. In a subscription television system including means for generating and transmitting to a subscribe station a subscription program having both a video and an audio signal, the combination of:

means for generating an inaudible first code signal for identifying the particular subscription program;

means for periodically transmitting said first code signal with the subscription program;

means for providing to the subscriber station substantially concurrently with said first signal a second code signal;

means for generating and transmitting to the subscriber station a third code signal;

control means adapted to be coupled to the subscription program disposed at the subscriber station;

said control means including switching means for selectively connecting the subscriber station to the subscription television program or to another program, and said switching means causing responsive to said second signal a first signal condition when the subscriber station is connected to said subscription program and a second condition when the subscriber station is connected to said another program;

and recording means coupled to said control means disposed at the subscriber station for receiving said first, second and third signals whereby to record, when actuated in response to the receipt of said third signal, said first signal to identify the subscription program, and to record said first or second condition and, hence, to record whether the subscriber station is connected to said subscription program or to said another program.

2. In a subscription television system including means for generating and transmitting to a subscriber station a subscription program having both a video and an audio signal, the combination of:

means for generating an inaudible first code signal for identifying the particular subscription program means for periodically transmitting said first code signal with the subscription program;

means for generating and transmitting to the subscriber station substantially concurrently with said first signal a second code signal;

means for generating and transmitting to the subscriber station a third code signal;

control means disposed at the subscriber station and adapted to be coupled to the subscription program;

said control means including switching means for selectively connecting the subscriber station to the subscription television program or to a non-subscription program and said switching means causing the passage or blockage respectively of said second signal;

and recording means, adapted to be coupled to said control means, disposed at the subscriber station for receiving said first, second and third signals whereby to record, when actuated in response to the receipt of said third signal, said first signal to identify the subscription program, and to record the presence or absence respectively of said second signal and, hence, to record whether the subscriber station is connected to said subscription program or to the non-subscription program.

3. In a subscription television system as set forth in claim 2 wherein said first signal is a digital tone code in the ultrasonic range for conditioning said recording means, and said third signal is a command signal for causing actuation of said recording means.

4. In a subscription television system as set forth in claim 2 wherein
said recording means includes a recording medium which is modified responsive to the receipt of said first signal at said subscription station and the presence or absence of said second signal at said recording means.

5. In a subscription television system as set forth in claim 2 wherein
said recording means includes a medium onto which indicia are affixed.

6. In a subscription television system as set forth in claim 2 wherein
said recording means includes magnetic data storage means.

7. In a subscription television system, the combination of:
transmitting means for transmitting to a subscriber station a television program;
said transmitting means including means for generating and transmitting periodically with said program a first code signal for identifying said program, for generating and transmitting substantially concurrently with said first code signal a second code signal for identifying the condition when the subscriber station is coupled to said program, and for generating and transmitting a third code signal for initiating the recording of said first code signal at the subscriber station;
a control unit and a recorder unit, which includes a cyclically operable recording mechanism, disposed at the subscriber station and adapted to be coupled to said transmitting means for respectively controlling the program selection at the subscriber station and to record the subscriber station program selection;
said control unit including switching means for connecting the subscriber's station alternatively to the subscription program or to a non-subscription program.
circuit means coupled to said switching means for establishing a first condition responsive to the receipt of said second signal when said switching means causes the subscriber station to be connected to the subscription program and establishing a second condition when the subscriber station is connected to a non-subscription program;
said recorder unit adapted to receive said first signal, a signal condition responsive to said first or second condition, and said third signal, whereby said first signal conditions said recorder unit for providing a record responsive to said first signal and a record commensurate with said signal condition responsive to said first or second condition, and said third signal causes the operation of said recording mechanism.

8. In a subscription television system as set forth in claim 7 wherein
said transmitting means, said recorder unit, and said control unit are inter-connected by a cable which is adapted to transmit the television program, said first, second and third signals, and the power provided by said control unit for operating said recorder unit.

9. In a subscription television system as set forth in claim 7 wherein
a cable connects said recorder unit to said control unit; radio frequency coupling means provide coupling of said recorder unit and of said control unit to said cable; and said recorder unit includes means for receiving an audio portion of the subscription program to provide for the monitoring of the subscription program reaching said control unit.

10. In a subscription television system as set forth in claim 7, wherein
said first code signal is transmitted at predetermined time intervals, wherein said second code signal is transmitted substantially concurrently with said first signal, and wherein said third signal is transmitted subsequent to the initiation of said first and second signals.

References Cited

UNITED STATES PATENTS

| | | | |
|---|---|---|---|
| 2,766,374 | 10/1956 | Hoffmann | 178—5.1 |
| 3,041,389 | 6/1962 | Court | 178—5.1 |
| 3,051,775 | 8/1962 | Novak | 178—5.1 |

ROBERT L. GRIFFIN, *Primary Examiner.*

JOHN W. CALDWELL, *Examiner.*

H. W. BRITTON, *Assistant Examiner.*